| United States Patent [19] | [11] 4,255,357 |
|---|---|
| Gardner et al. | [45] Mar. 10, 1981 |

[54] CATALYTIC PROCESS FOR PREPARING ETHYL AMINES

[75] Inventors: David A. Gardner, Montgomery; Roger T. Clark, Chester, both of Pa.

[73] Assignee: Pennwalt Corporation, Philadelphia, Pa.

[21] Appl. No.: 132,838

[22] Filed: Mar. 24, 1980

[51] Int. Cl.³ .............................................. C07C 85/06
[52] U.S. Cl. .................................................. 564/480
[58] Field of Search ........................ 260/585 B, 583 R

[56] References Cited

U.S. PATENT DOCUMENTS

| 2,861,995 | 11/1958 | Mackenzie | 260/583 R X |
|---|---|---|---|
| 3,067,255 | 12/1962 | Scholz et al. | 260/585 B |
| 3,270,059 | 8/1966 | Winderl et al. | 260/583 R |
| 3,475,344 | 10/1969 | Adam et al. | 260/585 B X |
| 4,014,933 | 3/1977 | Boettger et al. | 260/563 R |
| 4,153,581 | 5/1979 | Habermann | 260/585 B X |

FOREIGN PATENT DOCUMENTS

| 757164 | 4/1971 | Belgium | 260/585 B |
|---|---|---|---|
| 50-32113 | 3/1975 | Japan | 260/585 B |
| 50-116408 | 9/1975 | Japan | 260/585 B |

OTHER PUBLICATIONS

Badische, "Fine Chemicals Patents Journal", vol. 8, (24), British 5:1, (6-19-68).

*Primary Examiner*—John Doll
*Attorney, Agent, or Firm*—Allan R. Plumley

[57] ABSTRACT

A catalyst consisting essentially of reduced cobalt which is dispersed on a high surface area support is highly efficient in the reductive amination of ethyl alcohol to ethyl amines.

3 Claims, No Drawings

CATALYTIC PROCESS FOR PREPARING ETHYL AMINES

This invention relates to the manufacture of aliphatic amines by the reductive amination of alcohols, ethers or aldehydes in the vapor phase and more particularly to the manufacture of ethyl amines from ethyl alcohol and ammonia.

Ethyl amines have many important commercial uses. Monoethylamine is used in the synthesis of herbicides, corrosion inhibitors, wash and wear agents for fabrics, and catalysts for urethane foams. Diethylamine is used in the synthesis of rubber-processing chemicals, pharmaceuticals, epoxy curing agents, and insect repellents. Triethylamine is used in the production of textile treating chemicals, insecticides, and antibiotics.

The formation of amines from ammonia and alcohols has been studied since the early work of Sabatier and Mailhe, which was reported in Comptes Rendus, 148, 898 (1909).

Current manufacturing processes for ethyl amines are the reductive amination of alcohols, ethers, or aldehydes. As is disclosed in the prior art, in the manufacture of ethyl amines from ethyl alcohol and ammonia, the reactants are vaporized and passed with hydrogen over a metallic catalyst. These catalysts include Raney copper, silica-alumina, platinum-silica gel, aluminum phosphate, or reduced nickel on an inert support. Nickel catalysts appear to be the most common type in general use and are preferred over cobalt as set forth in U.S. Pat. No. 2,365,721.

We have now discovered that a catalyst consisting essentially of reduced cobalt, uniformly dispersed on a high surface area support, is unexpectedly superior in performance to the best commercial nickel catalysts for the reductive amination of ethyl alcohol. The total amount of cobalt on the support is not critical and can vary from about 10 to 65 weight percent based on the support. Preferably, however, the cobalt loading is about 20% to about 40% by weight. Catalysts with low cobalt loading have the highest activity per unit weight of cobalt and consequently are the least expensive. Catalysts with high cobalt loadings have the highest activity per unit reactor volume.

The carrier used as the support according to the invention may be purified silicon dioxide, naturally occurring silica minerals such as diatomite, naturally occuring silica-aluminas such as kaolins, synthetic silica-aluminas, aluminas or combination of these.

The silica-containing carrier or support may be used in the form of solid granules or tablets, as naturally occuring powders such as kieselguhr, or in the form of a colloidal aqueous solution such as Ludox HS (DuPont). The preferred carriers are diatomite or kieselguhr and $\gamma$-alumina.

We have found that although the composition of the reactant mixture is not critical, the preferred reactant mixture, alcohol/ammonia/hydrogen, on a molar basis is in the range 1/1/1 to 1/3/5. Hydrogen should be present to the extent of at least 10 mole percent at all times. The operating pressure is not critical but should be above atmospheric with the preferred range being from 200 to 500 psig.

The reaction temperature is critical and should be maintained between 140° and 225° C. Below 140° C. the reaction rate is too slow to be practical and above 225° C. losses occur due to undesirable side reactions, i.e. dehydrogenation of alcohol, dehydrogenation of amine products, formation of tars and the like. The preferred temperature range is 150° C. to 190° C. The outstanding advantage of reduced cobalt catalysts over nickel catalysts, we have discovered, is the much greater conversion under the same conditions while using the same volume of catalyst. This means a much higher amine production per unit of time when using the reduced cobalt catalysts of this invention.

The following Examples illustrate the invention and demonstrate the superiority of a properly constituted reduced cobalt catalyst over the commercial nickel catalysts.

EXAMPLE 1

Catalyst: 40% Nickel/Alumina (Calsicat Ni235T)
Surface Area: 2077 m$^2$/g; Pore Volume, 0.49 cm$^3$/g.

Under the laboratory screening thest conditions, a vapor phase catalytic reactor is charged with 45 cm$^3$ (45.36 g) of catalyst and the catalyst is reduced with hydrogen over a period of 24 hours. A gas mixture with a molar ratio ethyl alcohol/hydrogen/ammonia of 1/1.4/1.1 is fed to the reactor at a rate of $2.0 \times 10^{-3}$ moles/sec. The reaction is carried out at 170° C. and 235 psig pressure. The conversion of ethyl alcohol is 43.4%. The carbon efficiency to ethyl amines is >98% with the balance being largely methane. The molar ratio of monoethylamine/diethylamine/triethylamine in the proudct is 4.0/3.3/1.0.

EXAMPLE 2

Catalyst: 59% Nickel/Kieselguhr (Harshaw Ni-0104)
Surface Area: 150 m$^2$/g; Pore Volume, 0.25 cm$^3$/g.
Catalyst Charge: 45 cm$^3$ (64.1 g)

Testing procedure and reaction conditions same as Example 1. The conversion of ethyl alcohol is 44.0%. The carbon efficiency to ethyl amines is >98% with the balance being largely methane. The molar ratio of monoethylamine/diethylamine/triethylamine in the product is 4.3/3.5/1.0.

EXAMPLE 3

Catalyst: 24% Cobalt/Kieselguhr
Surface Area: 68 m$^2$/g; Pore Volume, 0.19 cm$^3$/g
Catalyst Charge: 42 cm$^3$ (45.36 g)

Testing procedure and reaction conditions same as Example 1. The conversion of ethyl alcohol is 64.9%. The carbon efficiency to ethyl amines is >98% with the balance being largely methane. The molar ratio of monoethylamine/diethylamine/triethylamine in the product is 2.8/2.2/1.0.

EXAMPLE 4

Catalyst: 36.3% Cobalt/Alumina
Surface Area: 191 m$^2$/g; Pore Volume, 0.47
Catalyst Charge: 45 cm$^3$ (45.36 g)

Testing procedure and reaction conditions same as Example 1. The conversion of ethyly alcohol is 63.7%. The carbon efficiency to ethyl amines is >98% with the balance being largely methane. The molar ratio of monoethylamine/diethylamine/triethylamine in the product is 1.2/3.1/1.0.

After the completion of the reaction the hot gaseous product is passed through a condenser and then a gas separator. The excess hydrogen and part of the unreacted ammonia is thus separated and recycled. The liquid phase in the gas separator consits of ammonia, amines; unconverted alcohol and water. This liquid can be sent to a series of distillation columns which in turn separates ammonia (which is recycled), the amine products and, finally, the unconverted alcohol (which is recycled). The bottoms in the last column is water which is discarded.

The space velocities in Examples 3 and 4 are calculated to be 3586/hr$^{-1}$ and high conversions of 64.9% and 63.7% are obtained at a temperature of only 170° C. When these Examples are compared with Example III of U.S. Pat. No. 2,365,721, where, using a nickel catalyst, similar space velocity (3650/hr$^{-1}$) required on average bed temperature of 194.3° C. to achieve a total conversion of 68.2%. This temperature difference is very important because, we have found, a nickel catalyst cannot maintain this level of conversion for a sustained period of time. Actually we have found that a nickel catalyst is irreparably damaged above 185° C.

Reduced cobalt has a clear advantage in that high conversions can be obtained at very high space velocities and at relatively low temperatures. Stated in another way, the reduced cobalt catalyst has a much higher productivity than nickel catalyst at the same temperature as exemplified by the Examples.

We claim:

1. A process for the preparation of ethyl amines by reacting ethyl alcohol, ammonia, and hydrogen over a supported catalyst consisting essentially of reduced cobalt in the vapor phase at temperatures in the range of 140° C. to 195° C.

2. The process of claim 1, wherein the catalyst support is diatomite, diatomaceous earth, kieselguhr, alumina or silica-alumina.

3. The process of claim 1 werein the alcohol/ammonia/hydrogen ratio, on a molar basis, is 1/1/1 to 1/3/5.

* * * * *